(12) United States Patent
Shen et al.

(10) Patent No.: US 6,429,568 B1
(45) Date of Patent: Aug. 6, 2002

(54) ROTATING ELECTRICAL MACHINE AND A PROCESS FOR MANUFACTURING IT

(75) Inventors: Jinxing Shen, Heidelberg; Ulrich Deckart, Leimen, both of (DE); Tom Porteous, Vaesteras (SE); Niels M. Jensen, Budaörs (HU)

(73) Assignee: ABB Research LTD, Zuerich (CH)

( * ) Notice: Subject to any disclaimer, the term of this patent is extended or adjusted under 35 U.S.C. 154(b) by 0 days.

(21) Appl. No.: 09/624,440

(22) Filed: Jul. 24, 2000

(30) Foreign Application Priority Data

Jul. 24, 1999 (DE) .......................... 199 34 858

(51) Int. Cl.[7] .................................. H02K 1/12
(52) U.S. Cl. ...................... 310/254; 310/259; 29/596
(58) Field of Search ........................... 310/254, 258, 310/259, 216, 218; 29/596, 598, 609, 605, 606

(56) References Cited

U.S. PATENT DOCUMENTS

| | | | | |
|---|---|---|---|---|
| 1,538,196 A | * | 5/1925 | Livingston .................. | 310/259 |
| 2,303,291 A | * | 11/1942 | Moss .......................... | 310/259 |
| 2,565,530 A | * | 8/1951 | Smith .......................... | 310/258 |
| 3,130,336 A | * | 4/1964 | Morris ........................ | 310/254 |
| 3,842,493 A | * | 10/1974 | Ohuchi et al. ................ | 29/596 |
| 4,912,353 A | * | 3/1990 | Kondo et al. ............... | 310/259 |
| 5,355,045 A | * | 10/1994 | Hisey .......................... | 310/259 |
| 5,671,524 A | * | 9/1997 | Damsky et al. ............... | 29/596 |
| 5,986,377 A | * | 11/1999 | Yamada et al. ............. | 310/216 |
| 6,064,132 A | * | 5/2000 | Nose ........................... | 310/216 |
| 6,225,725 B1 | * | 5/2001 | Itoh et al. .................... | 310/254 |

FOREIGN PATENT DOCUMENTS

| | | | |
|---|---|---|---|
| JP | 60002038 | * | 1/1985 |
| JP | 08237891 | * | 9/1996 |

* cited by examiner

Primary Examiner—Joseph Waks
(74) Attorney, Agent, or Firm—Laurence A. Greenberg; Werner H. Stemer; Gregory L. Mayback (57) ABSTRACT

A machine has an internally located rotor and an externally located stator. The stator is assembled from an outer stator ring and an inner stator ring. The outer stator ring and the inner stator ring are each wound from at least one strip and are connected together mechanically.

11 Claims, 8 Drawing Sheets

ROTATING ELECTRICAL MACHINE AND A PROCESS FOR MANUFACTURING IT

BACKGROUND OF THE INVENTION

Field of the Invention

The invention relates to a rotating electrical machine having an internally located rotor and an externally located stator that is assembled from an outer stator ring and an inner stator ring. The invention also relates to a method for manufacturing such a machine.

In machines with a rotor and a stator, configurations have become known in which the stator is built up from an outer stator ring and an inner stator ring. These two rings are in turn assembled from flat structural elements. All of these have the same shape. They are placed one upon the other and then pressed. Because the edge profiles of the flat structural elements are uniform for all the layers, there is a through gap that causes a substantial magnetic reluctance. The outer and inner stator rings are permanently connected together by a bonding agent. The gap is filled with a bonding agent that represents a substantial hindrance to the magnetic flux and for the removal of heat. Pollutants contained in the bonding agent also damage the environment.

The invention is therefore based on the object of presenting a machine, of the type mentioned at the beginning, in which it is possible to dispense with a bonding agent for connecting the outer stator ring to the inner stator ring. The invention is also based on the object of presenting a process by which such a machine can be manufactured.

SUMMARY OF THE INVENTION

It is accordingly an object of the invention to provide a rotating electrical machine and a process for manufacturing it that overcome the disadvantages of the prior art devices and methods of this general type.

With the foregoing and other objects in view there is provided, in accordance with the invention, a rotatable electrical machine. The machine contains an internally located rotor, and an externally located stator surrounding the rotor. The stator has an outer stator ring and an inner stator ring disposed in the outer stator ring. The outer stator ring and the inner stator ring are each wound from at least one strip and are permanently connected together mechanically.

In accordance with an added feature of the invention, the outer stator ring is shrunk onto the inner stator ring, the inner stator ring is shrunk into the outer stator ring, or the outer stator ring is shrunk on and the inner stator ring is shrunk into the outer stator ring.

In accordance with an additional feature of the invention, the strip forming the outer stator ring has a longitudinal axis, a longitudinal edge and wedge-shaped notches formed therein along the longitudinal edge. The notches have an inner end, longitudinal axes directed at right angles to the longitudinal axis of the strip, and an opening angle dimensioned just sufficiently large for the wedge-shaped notches to just close after a winding process. The strip further has a hole with a specifiable cross section at the inner end of each of the wedge-shaped notches.

In accordance with another feature of the invention, the longitudinal edge of the strip is provided with a concave curvature between each two of the wedge-shaped notches. The strip additionally has a further longitudinal edge provided with a convex curvature that is disposed opposite of the longitudinal edge. A distance between each of the two wedge-shaped notches has a length $L=D_i^* \sin(\pi/(n_s \pm 1/m))$, where $D_i$ is an inner diameter of the outer stator ring, $n_s \pm 1/m$ is a number of sections between the wedge-shaped notches which are necessary for winding a layer onto a mandrel, and an overlap of the sections from layer to layer is determined by m.

In accordance with another added feature of the invention, the strip is wound to form the outer stator ring such that the outer stator ring has an inner region bounded by the concave curvature of the longitudinal edge.

In accordance with another additional feature of the invention, the strip forming the inner stator ring has a width, a longitudinal axis and teeth. The teeth have longitudinal axes directed at right angles to the longitudinal axis of the strip, and the teeth have a length matched to the width of the strip.

In accordance with yet another feature of the invention, the teeth have a width, free first ends with flanks, and wedge-shaped recesses formed on each of the flanks. The strip forming the inner stator has webs each with a center region. The teeth have second ends connected to each other by the webs and each set of two of the teeth each directly following one another are connected together in each case by adjacent ones of the webs. The webs further have a length matched to the width of the teeth, and the webs have first and second longitudinal edges with a recess formed in at least one of the longitudinal edges in the center region.

With the foregoing and other objects in view there is further provided, in accordance with the invention, a process for manufacturing a rotatable electrical machine. The process includes the steps of providing an internally located rotor; and providing an externally located stator surrounding the rotor. The stator has an outer stator ring and an inner stator ring each wound from at least one strip and are subsequently permanently connected together mechanically.

In accordance with an added feature of the invention, there is the further step of shrinking the outer stator ring onto the inner stator ring, shrinking the inner stator ring into the outer stator ring, or shrinking the outer stator ring on the inner stator ring and shrinking the inner stator ring into the outer stator ring.

In accordance with an additional feature of the invention, there is the step of manufacturing the outer stator ring from the strip by a winding process. The strip has a longitudinal axis, a longitudinal edge and wedge-shaped notches formed along the longitudinal edge. The notches have an inner end, longitudinal axes directed at right angles to the longitudinal axis of the strip, and an opening angle dimensioned such that the wedge-shaped notches just close after the winding process. The strip further has holes with a specifiable cross section and one of the holes is formed at the inner end of each of the wedge-shaped notches.

In accordance with another feature of the invention, there is the step of forming each section of the strip disposed between two of the wedge-shaped notches with a concave curvature along the longitudinal edge. The section with a convex curvature is formed along a further longitudinal edge disposed opposite the longitudinal edge. And the strip of the outer stator ring is formed such that a distance between each two of the wedge-shaped notches has a length $L=D_i^*\sin(\pi/(n_s \pm 1/m))$, where $D_i$ is an inner diameter of the outer stator ring, $n_s \pm 1/m$ is a number of sections between the wedge-shaped notches which are necessary for winding a layer on a mandrel for forming the outer stator ring, and an overlap of the sections from layer to layer is determined by m.

In accordance with yet another feature of the invention, there is the step of winding the strip forming the outer stator ring such that each of the notches of each layer is overlapped by a completely closed piece of the strip in order to avoid air gaps.

In accordance with another added feature of the invention, there is the step of winding the strip forming the outer stator ring on a mandrel having an outer diameter selected to be equal to or slightly smaller than an inner diameter of the outer stator ring. The strip forming the outer stator ring is wound onto the mandrel such that the longitudinal edge with the wedge-shaped notches bears on the mandrel.

In accordance with another additional feature of the invention, there is the step of forming the strip for the inner stator ring with teeth. The teeth have longitudinal axes directed at right angles to a longitudinal axis of the strip forming the inner stator ring and a length of the teeth is matched to a width of the strip forming the inner stator ring. The strip is wound for forming the inner stator ring.

In accordance with an added feature of the invention, there is the step of forming the teeth, in a region of a first free end, with a wedge-shaped recess on flanks of the teeth. And forming the strip for the inner stator ring with webs disposed between and connecting second ends of adjacent ones of the teeth. A length of the webs is matched with a width of the teeth and the webs have in a central region a recess on at least one of two longitudinal edges of each the webs.

In accordance with another feature of the invention, there are the steps of forming the inner stator ring by winding the strip onto a mandrel such that the webs bear on the mandrel; and subsequently disposing an electrical winding in each case in a space formed between two stacks of the teeth.

In accordance with a concomitant feature of the invention, there is the step of forming a further outer stator ring from at least one further strip and using the further outer stator ring as a part of the rotor.

Other features which are considered as characteristic for the invention are set forth in the appended claims.

Although the invention is illustrated and described herein as embodied in a rotating electrical machine and a process for manufacturing it, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
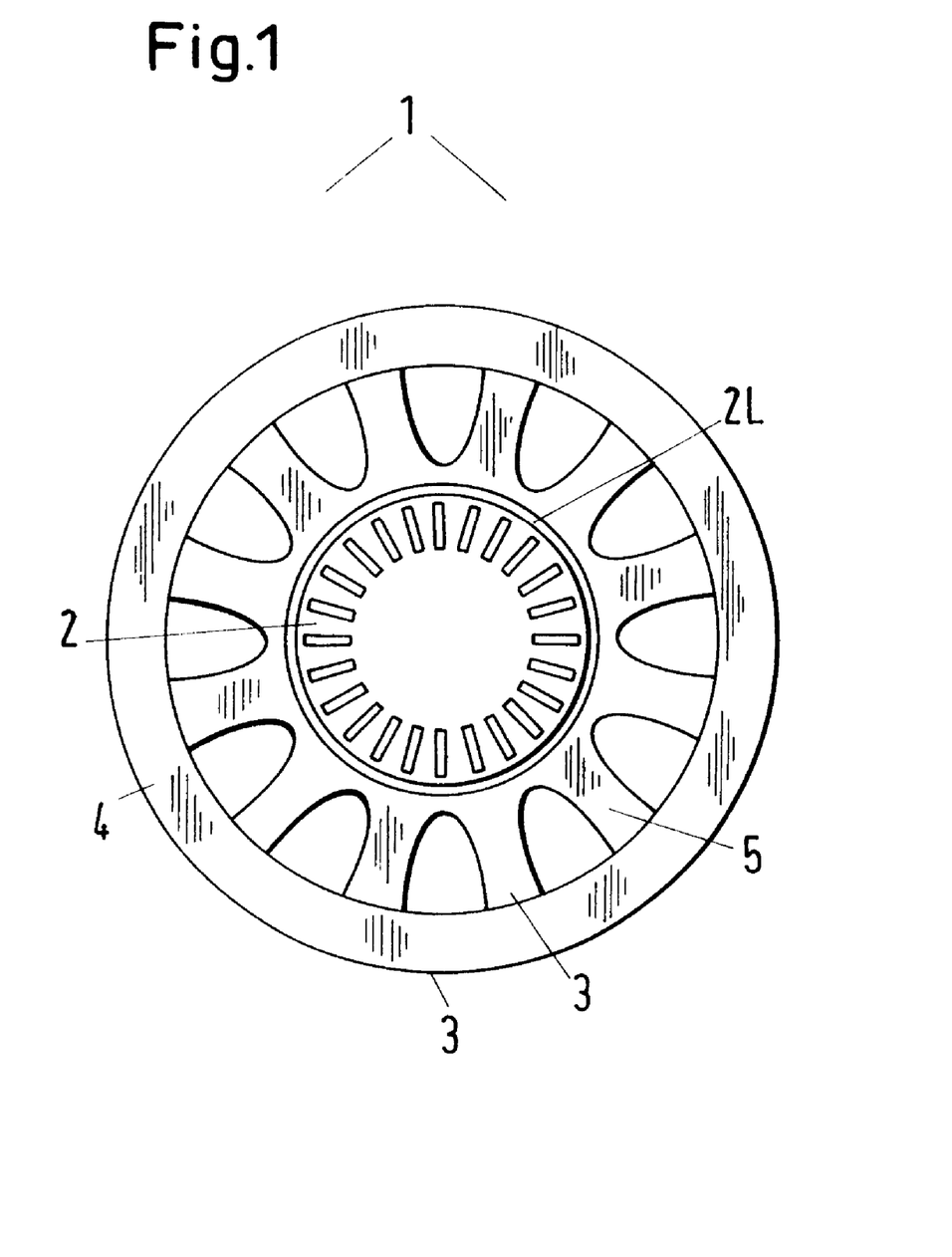
FIG. 1 is a diagrammatic, vertical sectional view of a rotating electrical machine according to the invention.

In all the figures of the drawing, sub-features and integral parts that correspond to one another bear the same reference symbol in each case. Referring now to the figures of the drawing in detail and first, particularly, to FIG. 1 thereof, there is shown a rotating electrical machine 1 with an internally located rotor 2 and an externally located two-part stator 3. The rotor 2 and the stator 3 are separated from one another by an annular air gap 2L. The stator 3 is permanently assembled from an outer stator ring 4 and an inner stator ring 5. A connection between the outer stator ring 4 and the inner stator ring 5 takes place with the aid of a shrinking process. In this process, the outer stator ring 4 is, for example, heated. After its inner diameter has extended as far as is necessary, it is pushed over the inner stator ring 5. After the cooling of the outer stator ring 4, the two rings are permanently and firmly connected together. For the shrunk connection, it is also possible for the inner stator ring 5 to be greatly cooled so that its outer diameter is reduced. When the desired dimensions are achieved, the inner stator ring 5 is pushed into the outer stator ring 4. It is also possible to heat the outer stator ring 4 and to cool the inner stator ring 5 at the same time. In this case, it is not necessary to heat the outer stator ring 4 as much as in the case where the inner stator ring 5 is not cooled at all. When there is less heating of the outer stator ring 4, insulation materials of the sheet metal and the copper wires are protected.

Figure 2:
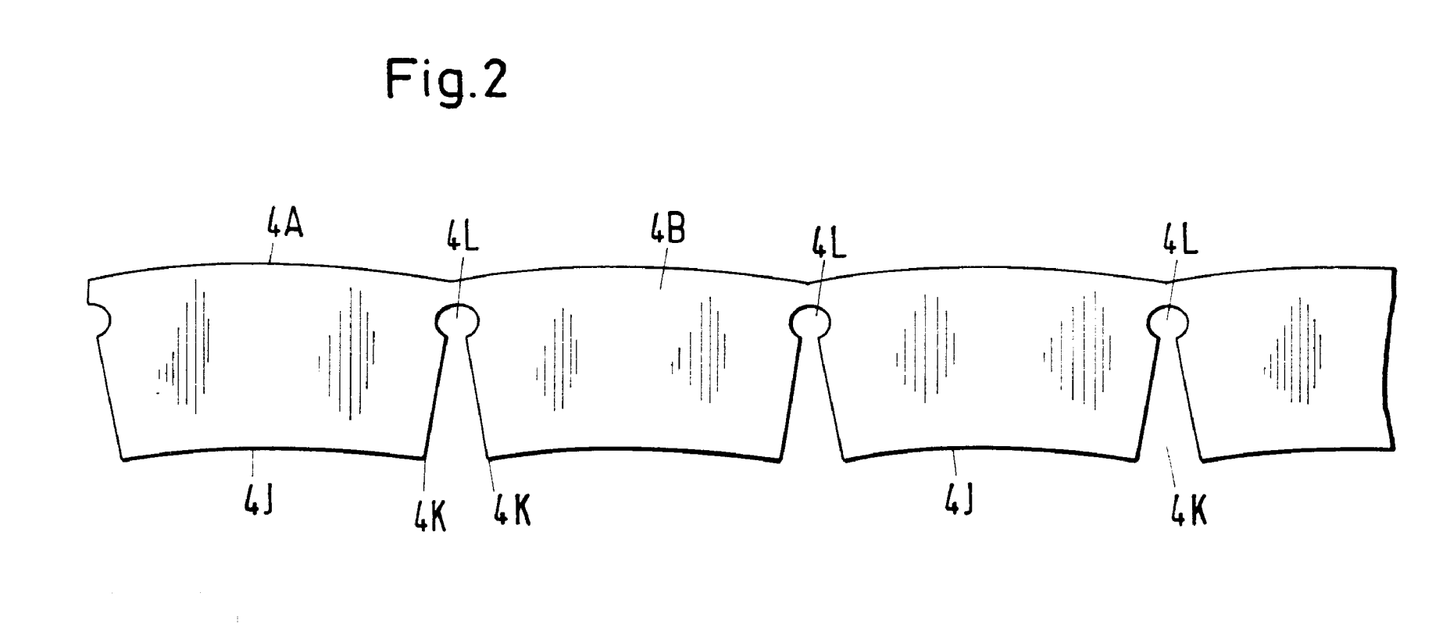
FIG. 2 is a fragmented, front-elevational view of a strip for winding an outer stator ring.
Figure 3:
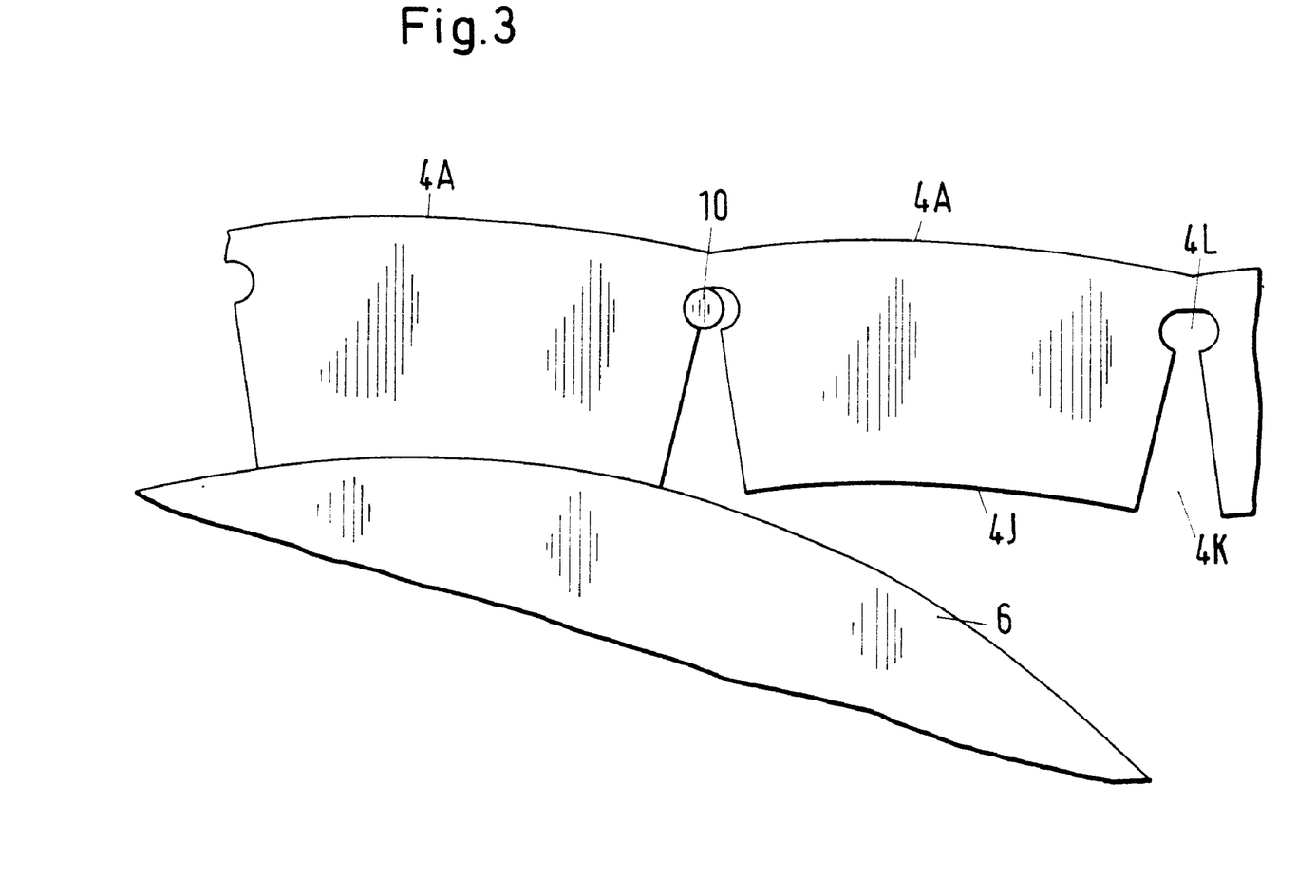
FIG. 3 is a fragmented, front-elevational view of the winding of the outer stator ring.
Figure 4:
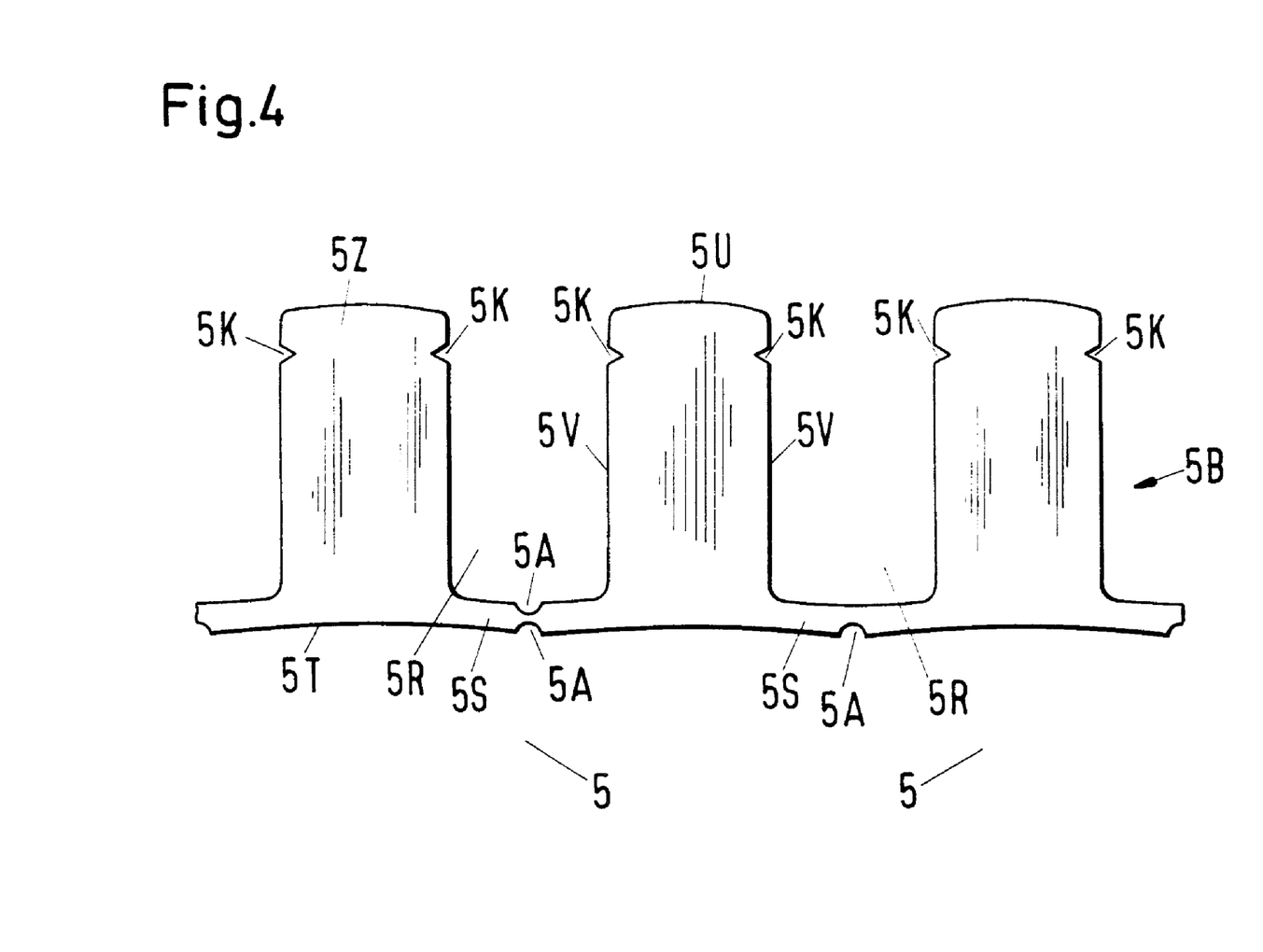
FIG. 4 is a fragmented, front-elevational view of a strip for winding an inner stator ring.

In accordance with the invention, both the outer stator ring 4 and the inner stator ring 5 are manufactured from specially shaped strips 4B and 5B, respectively, as may be seen in FIGS. 2 and 4. One or a plurality of such strips 4B, 5B are necessary for the manufacture of the outer stator ring 4 and the inner stator ring 5, respectively. The number of strips 4B, 5B depends on the desired size of the stator 3. An excerpt from a strip 4B, which is used for winding the outer stator ring 4, is shown in FIG. 2. The strip 4B is provided with wedge-shaped notches 4K at defined distances apart. Each wedge-shaped notch 4K extends at right angles to a longitudinal axis of the strip 4B. An opening angle of the wedge-shaped notch 4K is configured in such a way that the wedge-shaped 4K openings have just been closed after winding. A hole 4L is formed at an inner end of each wedge-shaped notch 4K. In the embodiment example shown here, the holes 4L have an almost circular cross section. The holes 4L can also, however, have a different cross section, as may be seen from FIG. 3. The deformations to the strip 4B during winding are localized by the wedge-shaped notches 4K and the holes 4L. As may be seen from FIG. 3, a first strip 4B is wound onto a mandrel 6 in order to form the outer stator ring 4. The mandrel 6 has a diameter that corresponds to an inner diameter of the outer stator ring 4 that has to be formed. As may also be seen from FIGS. 2 and 3, a longitudinal edge 4J, by which the strip 4B is placed on the mandrel 6, has a concave curvature whereas a second longitudinal edge 4A has a convex curvature. A distance between each two wedge-shaped notches 4K has a length $L=D_i*\sin(\pi/(n_s\pm 1/m))$, where $D_i$ is the inner diameter of the outer stator ring 4; $n_s\pm 1/m$ is the number of sections between the wedge-shaped notches 4K, which are necessary for winding a layer onto the mandrel 6. The overlap of the sections from layer to layer is determined by the parameter m.

Figure 8:
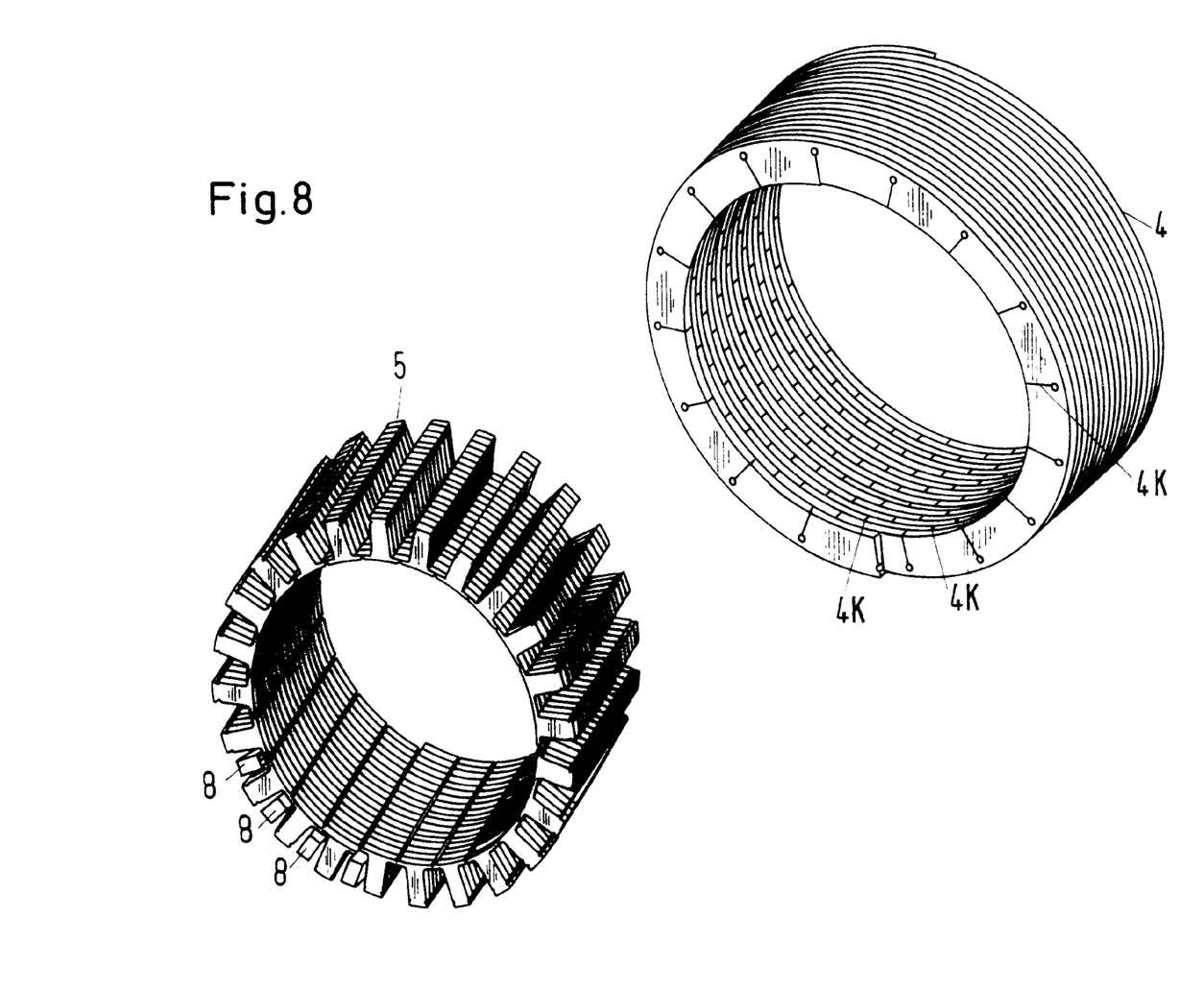
FIG. 8 is an exploded, perspective view of the outer stator ring and the inner stator ring before they are joined together.

When the strip 4B is being wound on, each notch 4K in a layer is covered on both sides by a completely closed piece of the strip 4B, as may be seen from FIG. 8. There is no location in the winding at which the notches 4K of a previous layer and a subsequent layer lie congruently on one another. The formation of air gaps is therefore completely excluded even between two sequential layers. There is, therefore, no hindrance to and therefore no reduction in the magnetic flux at any point within the outer stator ring 4.

The strip 4B is wound, layer for layer, onto the mandrel 6 and, in fact, in such a way that the longitudinal edge 4J bears on the mandrel 6. In the process, the strip 4B is pushed together in the region of the wedge-shaped notches 4K so that the deformations of the strip 4B are localized. A closed strip 4B appears during the winding because the wedge-shaped notches 4K are pushed together. If difficulties should arise when placing the edges and positioning the strip 4B, it is possible to push assembly pins 10, by which the strip 4B can be positioned at the respectively specified position, into the holes 4L. When the desired number of windings or layers has been wound on, the strip 4B is cut through. The end located on the mandrel 6 is fastened in such a way that the strip 4B cannot slide independently of the mandrel 6. The outer stator ring 4 manufactured thus far is subsequently pressed together with a specifiable pressure so that no air gaps remain between the windings or layers. The outer stator ring 4 is manufactured by this method.

Figure 5:
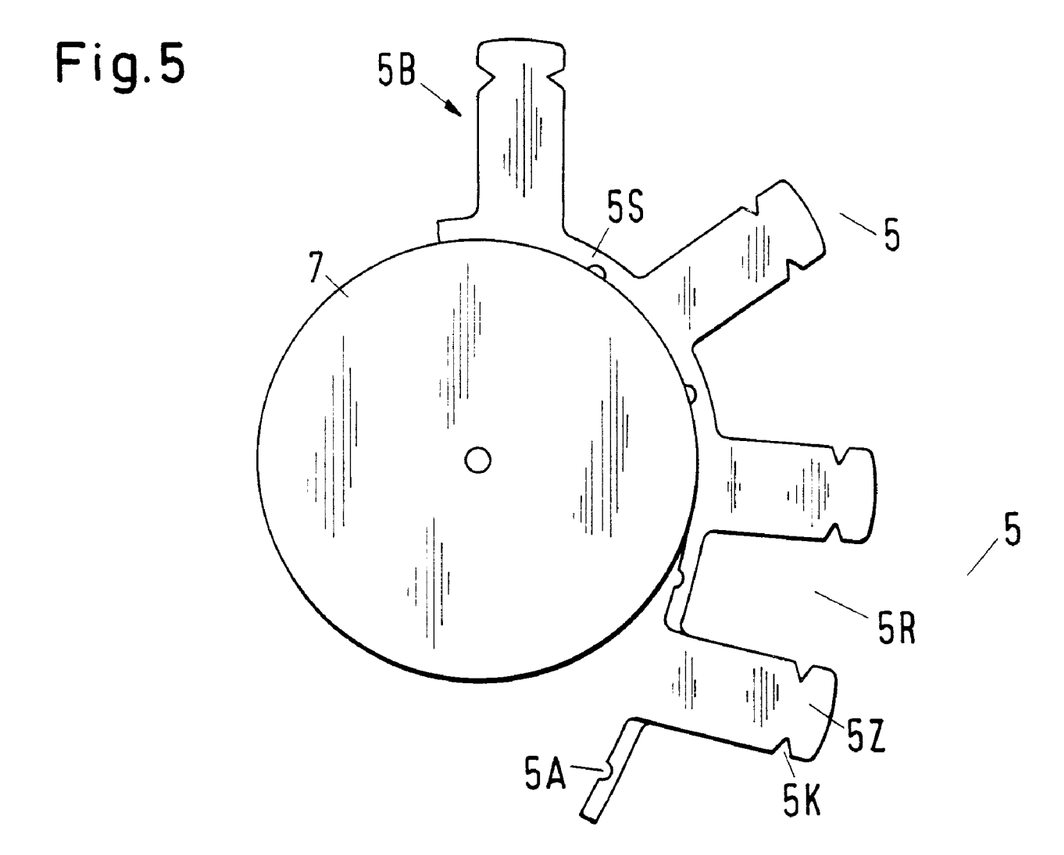
FIG. 5 a fragmented, side-elevational view of a winding of the inner stator ring.

The inner stator ring 5 is manufactured in a similar manner. For this purpose, the strip 5B shown in FIG. 4 is used. The strip 5B is provided with teeth 5Z whose longitudinal axes are directed at right angles to the longitudinal axis of the strip 5B. Tooth flanks 5V stand at right angles to the longitudinal axis of the strip 5B. As may also be seen in FIGS. 4 and 5, a longitudinal edge 5T (with which the strip 5B is placed on a mandrel 7) has a concave curvature whereas a second longitudinal edge 5U has a convex curvature. On its free first end on each flank 5V, each tooth 5Z can be provided with a wedge-shaped recess 5K, which can be used for bounding copper wires to be laid within a space 5R. Two directly following teeth 5Z are connected together at their second ends by in each case one web 5S. Each web 5S is provided at the center on one or each of the two longitudinal edges with a recess 5A. As shown here, the recesses 5A can have an almost semicircular cross section which, if required, can also be otherwise shaped. The deformation of the strip 5B when winding on is localized by this as shown in FIG. 5.

Figure 6:
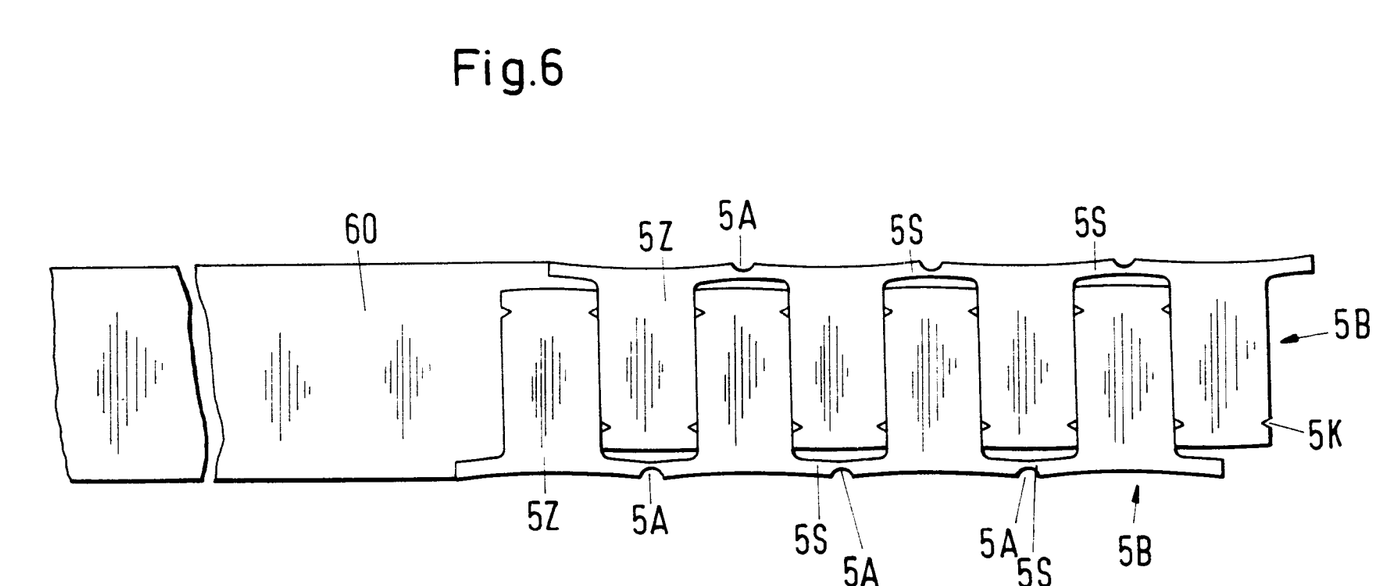
FIG. 6 is a top plan view of a manufacturing process for manufacturing the strip shown in FIG. 4.
Figure 7:
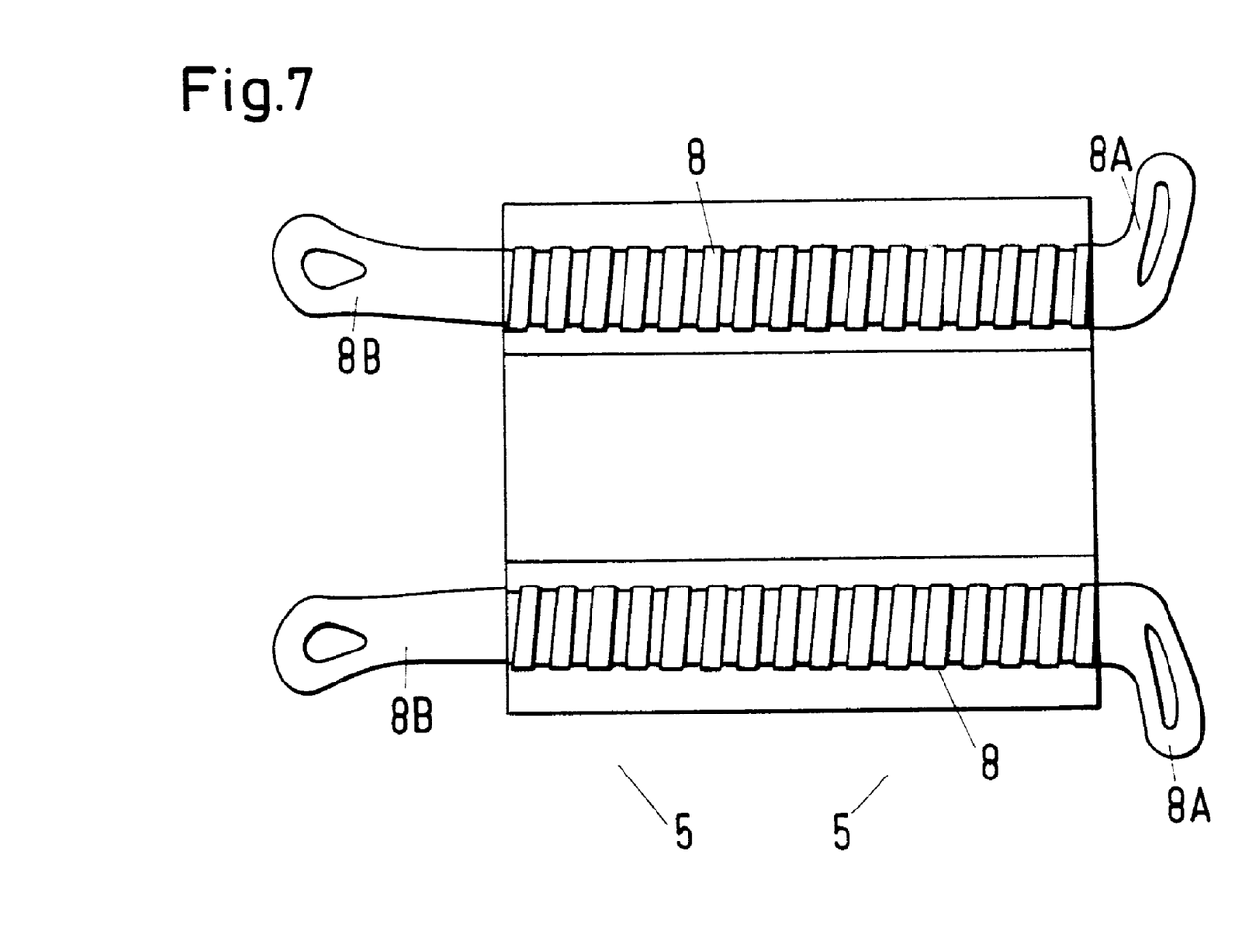
FIG. 7 is a sectional view of a wound inner stator ring.

The mandrel 7 is used for winding the inner stator ring 5. The mandrel 7 has an outer diameter that is matched to the desired inner diameter of the inner stator ring 5. A strip 60, as shown in FIG. 6 and which is slightly wider than the strip 5B, is used for the manufacture of the strip 5B. Using an appliance appropriate to this purpose (not shown here), two strips 5B can be produced from the strip 60. This is possible because the distance between each two teeth 5Z is matched to the width of the teeth 5Z. The width of the strips 5B is matched to the desired width of the outer diameter that the inner stator ring S should have. If the inner stator ring 5 is cooled for connection to the outer stator ring 4, so that its outer diameter shrinks somewhat initially, the outer diameter of the inner stator ring 5 is configured to be slightly larger than the inner diameter of the outer stator ring 4. The strip 5B is wound, layer for layer, onto the mandrel 7 in such a way that the outer edges of the webs 5S bear on the surface of the mandrel 7. This ensures that the teeth 5Z of each layer come to be coincident with the teeth 5Z of the layer already wound on, as is shown in FIG. 8. This achieves the effect that the space 5R is formed between two sequential stacks of teeth 5Z, the space 5R having the same dimensions over the whole of its length. Each of the spaces 5R is laterally bounded by a stack of the teeth 5Z and on the inwardly facing side by a stack of the webs 5S. The spaces 5R are open towards the outside. When the inner stator ring 5 has reached the desired length, the strip 5B is cut through and fastened in such a way that it cannot slide independently of the mandrel 7. The inner stator ring 5 is subsequently pressed in such a way that no air gaps remain between the individual layers of the strip 5B which has been wound on. The inner stator ring 5 has therefore also been finished. An electrical winding 8 is now inserted in each of the spaces 5R, as is shown in part in FIG. 7. In order to economize on copper, the electrical windings 8 have connections 8A, which are bent to the side, at their first ends, whereas the connections 8B at the second ends of the electrical windings 8 are guided parallel to the axis of symmetry of the inner stator ring 5. In this case, the inner stator ring 5 can only be pushed in from one direction and the outer stator ring 4 can only be pushed from one direction over the inner stator ring 5 when the two stator rings 4 and 5 are connected. In the case where it is not necessary to economize on copper in the manufacture of the windings 8, the windings 8 can be provided with connections 8B at both ends. This facilitates the connection between the two stator rings 4 and S. In accordance with the invention, the two stator rings 4 and 5 are connected together with the aid of a shrinking process. For this purpose, in the embodiment example shown, the inner stator ring 5 is initially cooled and the outer stator ring 4 is initially heated. The inner stator ring 5 is subsequently pushed into the outer stator ring 4 or the outer stator ring 4 is pushed over the inner stator ring 5, as is shown in FIG. 8. When the two stator rings 4 and 5 have again returned to room temperature, they are firmly and permanently connected together.

In accordance with the invention, the possibility exists for a ring that is manufactured in a similar manner to the outer stator ring 4 to be used as a part of the rotor of an electrical machine.

We claim:
1. A rotatable electrical machine, comprising:
an internally located rotor; and
an externally located stator surrounding said rotor, said stator having an outer stator ring and an inner stator ring disposed in said outer stator ring, said outer stator ring and said inner stator ring each wound from at least one strip and being permanently connected together mechanically by at least one of said outer stator ring being shrunk onto said inner stator ring and said inner stator ring being shrunk into said outer stator ring;
said at least one strip forming said outer stator ring having a longitudinal axis, a longitudinal edge and wedge-shaped notches formed therein along said longitudinal edge, said notches having an inner end, longitudinal axes directed at right angles to said longitudinal axis of said strip, and an opening angle dimensioned just sufficiently large enough for said wedge-shaped notches to just close after a winding process, said strip having a hole formed therein with a given cross section at said inner end of each of said wedge-shaped notches;
said longitudinal edge of said strip being provided with a concave curvature between each two of said wedge-shaped notches, an opposite longitudinal edge having a convex curvature, and said two wedge-shaped notches defining a distance therebetween having a length

$L = D_i * \sin(\pi/(n_s \pm 1/m))$, where $D_i$ is an inner diameter of said outer stator ring, $n_s \pm 1/m$ is a number of sections between said wedge-shaped notches being necessary for winding a layer onto a mandrel, and an overlap of said sections from layer to layer determined by m.

2. The machine according to claim 1, wherein said strip is wound to form said outer stator ring such that said outer stator ring has an inner region bounded by said concave curvature of said longitudinal edge.

3. The machine according to claim 1, wherein said strip forming said inner stator ring has a width, a longitudinal axis and teeth, said teeth having longitudinal axes directed at right angles to said longitudinal axis of said strip, and said teeth having a length matched to said width of said strip.

4. The machine according to claim 3, wherein:

said teeth have a width, free first ends with flanks, and wedge-shaped recesses formed on each of said flanks; and said strip forming said inner stator has webs each with a center region, said teeth have second ends connected to each other by said webs and each set of two of said teeth each directly following one another are connected together in each case by adjacent ones of said webs, said webs having a length matched to said width of said teeth, and said webs have first and second longitudinal edges with a recess formed in at least one of said longitudinal edges in said center region.

5. A process for manufacturing a rotatable electrical machine, which comprises the steps of:

providing an internally located rotor;

providing an externally located stator surrounding the rotor, the stator having an outer stator ring and an inner stator ring each wound from at least one strip;

manufacturing the outer stator ring from the strip by a winding process, the strip having a longitudinal axis, a longitudinal edge and wedge-shaped notches formed therein along the longitudinal edge, the notches having an inner end, longitudinal axes directed at right angles to the longitudinal axis of the strip, and an opening angle dimensioned such that the wedge-shaped notches just close after the winding process, and the strip having holes formed therein with a specifiable cross section and one of the holes formed at the inner end of each of the wedge-shaped notches;

forming each section of the strip disposed between two of the wedge-shaped notches with a concave curvature along the longitudinal edge; forming the section with a convex curvature along a further longitudinal edge disposed opposite the longitudinal edge;

forming the strip of the outer stator ring such that a distance between each two of the wedge-shaped notches has a length $L = D_i * \sin(\pi/(n_s \pm 1/m))$, where $D_i$ is an inner diameter of the outer stator ring, $n_s \pm 1/m$ is a number of sections between the wedge-shaped notches which are necessary for winding a layer on a mandrel for forming the outer stator ring, and an overlap of the sections from layer to layer is determined by m; and permanently connecting the outer stator ring and the inner stator ring together mechanically by at least one of shrinking the outer stator ring onto the inner stator ring and shrinking the inner stator ring into the outer stator ring.

6. The process according to claim 5, which comprises winding the strip forming the outer stator ring such that each of the notches of each layer is overlapped by a completely closed piece of the strip in order to avoid air gaps.

7. The process according to claim 5, which comprises winding the strip forming the outer stator ring on a having an outer diameter selected to be one of equal to and slightly smaller than an inner diameter of the outer stator ring, and the strip forming the outer stator ring is wound onto the mandrel such that the longitudinal edge with the wedge-shaped notches bears on the mandrel.

8. The process according to claim 5, which comprises:

forming the strip for the inner stator ring with teeth, the teeth having longitudinal axes directed at right angles to a longitudinal axis of the strip forming the inner stator ring and a length of the teeth is matched to a width of the strip forming the inner stator ring; and winding the strip for forming the inner stator ring.

9. The process according to claim 8, which comprises:

forming the teeth, in a region of a first free end, with a wedge-shaped recess on flanks of the teeth;

forming the strip for the inner stator ring with webs disposed between and connecting second ends of adjacent ones of the teeth; and matching a length of the webs with a width of the teeth and providing the webs in a central region with a recess on at least one of two longitudinal edges of each the webs.

10. The process according to claim 9, which comprises:

forming the inner stator ring by winding the strip onto a mandrel such that the webs bear on the mandrel; and subsequently disposing an electrical winding in each case in a space formed between two stacks of the teeth.

11. The process according to claim 5, which comprises forming a further outer stator ring from at least one further strip and using the further outer stator ring as a part of the rotor.

* * * * *